United States Patent
Stubbs et al.

(10) Patent No.: US 6,947,341 B2
(45) Date of Patent: Sep. 20, 2005

(54) INTEGRATED SEMICONDUCTOR MEMORY CHIP WITH PRESENCE DETECT DATA CAPABILITY

(75) Inventors: Eric T. Stubbs, Boise, ID (US); Gordon D. Roberts, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/007,219

(22) Filed: Dec. 9, 2004

(65) Prior Publication Data

US 2005/0099863 A1 May 12, 2005

Related U.S. Application Data

(62) Division of application No. 10/620,612, filed on Jul. 17, 2003, which is a continuation of application No. 09/291,369, filed on Apr. 14, 1999, now Pat. No. 6,625,692.

(51) Int. Cl.$^7$ ............................................... G11C 29/00
(52) U.S. Cl. ............. 365/201; 365/230.01; 365/230.03; 365/225.7; 711/115; 711/170
(58) Field of Search ........................... 365/201, 230.01, 365/230.03, 236, 225.7; 711/115, 170, 103

(56) References Cited

U.S. PATENT DOCUMENTS

| | | | |
|---|---|---|---|
| 3,614,621 A | 10/1971 | Chapman et al. | |
| 5,446,860 A | 8/1995 | Dresser et al. | |
| 5,471,040 A | 11/1995 | May | |
| 5,539,912 A | 7/1996 | Clarke, Jr. et al. | |
| 5,715,207 A | 2/1998 | Cowell | |
| 5,765,188 A | 6/1998 | Cowell | |
| 5,862,320 A | 1/1999 | Nelsen et al. | |
| 5,974,499 A | 10/1999 | Norman et al. | |
| 5,995,405 A | * 11/1999 | Trick ............................ 365/63 |
| 6,092,146 A | 7/2000 | Dell et al. | |
| 6,209,074 B1 | * 3/2001 | Dell et al. ................... 711/170 |
| 6,298,426 B1 | 10/2001 | Ajanovic | |
| 6,381,685 B2 | 4/2002 | Dell et al. | |

* cited by examiner

Primary Examiner—Anh Phung
Assistant Examiner—Toan Le
(74) Attorney, Agent, or Firm—Dickstein Shapiro Morin & Oshinsky LLP

(57) ABSTRACT

An integrated semiconductor memory chip includes hard-wired presence detect data which can be accessed for transmission to a location external to the memory chip as well as logic allowing additional presence detect data to be programmed in the memory chip after fabrication of the memory chip. Storing the presence detect data on the memory chip rather than on a separate integrated circuit can help reduce the number of integrated chips required for a memory module, which may include multiple DRAM or other memory chips. Hardwiring at least some of the presence detect data during fabrication of the chip can reduce the number of programming errors as well as the number of mismatches that might otherwise occur if a separate presence detect data chip were used. On the other hand, the capability of programming presence detect data after fabrication of the memory chip provides additional flexibility, allowing the foregoing techniques to be used with a wide variety of memory chips and modules.

10 Claims, 12 Drawing Sheets

FIG. 5B

INTEGRATED SEMICONDUCTOR MEMORY CHIP WITH PRESENCE DETECT DATA CAPABILITY

This application is a divisional of application No. 10/620,612, filed on Jul. 17, 2003, which is a continuation of application No. 09/291,369, filed Apr. 14, 1999, now U.S. Pat. No. 6,625,692, which are hereby incorporated by reference in their entirety.

BACKGROUND

The present invention relates generally to computer memory devices and, more particularly, to devices and techniques for establishing information relating to the configuration or capabilities of memory devices, such as DRAMs.

The requirements of computer memory can vary with respect to capacity, speed, data bus width and other features depending on the application of the computer. Manufacturers of general purpose computers, for example, sometimes provide modular memory subsystems which include multiple slots or connectors for memory modules. Memory modules then can be mounted in one or more of the slots. The memory modules, in turn, may vary with respect to capacity, speed, data bus width, etc.

An exemplary computer uses a memory controller for converting a memory address supplied by a central processing unit (CPU) into the required address and control signals for accessing a particular memory location. The memory controller generates row address strobe (RAS), column address strobe (CAS), and write enable (WE) signals, and can be implemented in one or more integrated circuits. When the memory is modular, the memory controller and the CPU must receive information which defines or identifies the memory configuration in order to supply the required address and control signals.

Typically, each memory module provides a number of presence detect codes or bits which include information relating to the capacity of the memory module, its speed, etc. The configuration and capabilities of the memory module then can be determined from the presence detect bits. Examples of memory modules that provide presence detect bits include single in-line memory modules (SIMMs), dual in-line memory modules (DIMMs), and small outline dual in-line memory modules (SO-DIMMs).

Originally, a separate pin was provided for each bit of information using parallel presence detect (PPD) techniques. To allow additional information to be provided, serial presence detect (SPD) techniques have been introduced. Generally, an integrated circuit chip, which is a separate chip from an associated memory chip or memory module, stores and provides the SPD information. For example, a serial EEPROM can be used to store the presence detect information and generally requires only an enable pin and a single data pin. The SPD information must either be pre-programmed into the SPD chip or the assembler of the memory chip circuit board must program that information at the time of assembly. Since all the presence detect bits on each SPD chip must be programmed separately after fabrication of the SPD chip, a relatively high level of programming errors can be introduced. Failure rates as high as about 1% have been known to occur. Additionally, the wrong SPD chip occasionally is used for a particular memory chip, thereby increasing the average costs of manufacture. Accordingly, it is desirable to achieve a reduction in the overall manufacturing costs associated with computer memory modules as well as a reduction in the number of programming errors associated with presence detect information.

SUMMARY

In general, according to one aspect, an integrated semiconductor memory chip can include hardwired presence detect data which can be accessed for transmission to a location external to the memory chip as well as logic allowing additional presence detect data to be programmed in the memory chip after fabrication of the memory chip.

Various implementations include one or more of the following features. The hardwired presence detect data can include multiple bits, wherein a value of each hardwired bit is based on whether a conductive region of the chip corresponding to that bit is connected electrically to a predetermined voltage when power is supplied to the chip. For example, the value of each hardwired bit can be based on whether the conductive region of the chip corresponding to that bit is connected electrically to ground. In some implementations, the difference between a first hardwired bit representing a digital high value and a second hardwired bit representing a digital low value can be implemented by the presence or absence of a portion of a metal layer on the memory chip. In other implementations, the difference between the first and second hardwired bits can be implemented by the presence or absence of a portion of a polysilicon layer. In yet other implementations, the difference between the first and second hardwired bits can be implemented by the presence or absence of doping in a portion of the semiconductor substrate on which the memory chip is fabricated.

The logic allowing additional presence detect data to be programmed in the memory chip after fabrication of the memory chip can include a programmable fuse corresponding to each bit of programmable presence detect data. Examples of such fuses include antifuses, laser fuses, and electrical fuses. In other implementations, the programmable presence detect data can be implemented on the memory chip using a flash transistor corresponding to each bit of programmable presence detect data.

In some embodiments, the integrated semiconductor memory chip can include a counter for receiving a control signal and for providing address bits at its output in response to the control signal. The memory chip also can include a switching device for allowing the presence detect data to be selected individually in response to the address bits for serial transmission to a location external to the memory chip. In some implementations, the switching device can include a multiplexer or a cascade of transistors.

According to another aspect, a memory module includes multiple memory chips, wherein at least one of the memory chips includes presence detect data which can be accessed for transmission to a location external to the memory module. Each of the memory chips on the module can have the same memory capacity, although this need not be the case. In one particular implementation, the memory chips include dynamic random access memory chips.

In yet another aspect, a computer system includes a central computer unit for supplying a memory address as well as a memory controller for converting a memory address supplied by the central processing unit into address and control signals to access a memory location in a memory module. The memory controller also can transmit presence detect data to the central processing unit. In addition, the computer system includes a memory module having drivers for receiving the address and control signals and multiple memory chips. At least one of the memory chips includes presence detect data which can be accessed for transmission to the memory controller.

In another aspect, a method of providing configuration information of a memory device includes hardwiring a first set of presence detect bits on an integrated semiconductor memory chip during fabrication of the memory chip. The act of hardwiring can be accomplished using a mask programmable photolithographic pattern. In addition, a second set of programmable presence detect bits can be provided on the memory chip.

The invention also features a method of providing information relating to a configuration or capabilities of a memory device having an integrated semiconductor memory chip that includes a set of programmable presence detect bits on the memory chip. The method includes setting a value for at least one of the programmable presence detect bits. The value of a programmable presence detect bit can be set, for example, by applying a voltage across an antifuse on the memory chip to form a short circuit, by directing radiation at a fuse on the memory chip to form an open circuit, or by raising a turn-on threshold voltage level of a transistor on the memory chip. If flash transistors are used, for example, then raising the turn-on threshold voltage can include applying a voltage across a drain and control gate of the transistor so as to trap charge in a floating gate of the transistor.

Another aspect relates to a method of providing information relating to configuration or capabilities of a memory module comprising at least one integrated semiconductor memory chip. The method includes accessing presence detect data stored on the at least one memory chip, and sending the presence detect data to a memory controller. The presence detect data can then be sent from the memory controller to a central processing unit. In some cases, the presence detect data is sent to the memory controller in serial form.

Storing the presence detect data on the memory chip(s) rather than on a separate integrated circuit can help reduce the number of integrated chips required for the memory module. Furthermore, hardwiring at least some of the presence detect data during fabrication of the chip, such as during photolithographic processes, can reduce the number of programming errors as well as the number of mismatches that might otherwise occur if a separate presence detect data chip were used. On the other hand, the capability of programming presence detect data after fabrication of the memory chip provides additional flexibility, allowing the foregoing techniques to be used with a wide variety of memory chips and modules. Furthermore, the foregoing techniques are easily integrated into conventional fabrication process flows for memory chips such as DRAMs.

Other features and advantages will be readily apparent from the following detailed description, the accompanying drawings, and the claims.

BRIEF DESCRIPTION OF THE DRAWINGS

FIGS. 5A and 5B are cross-sectional diagrams of a semiconductor device illustrating one embodiment of presence detect bits hardwired during fabrication of a memory chip.

DETAILED DESCRIPTION

Figure 1:
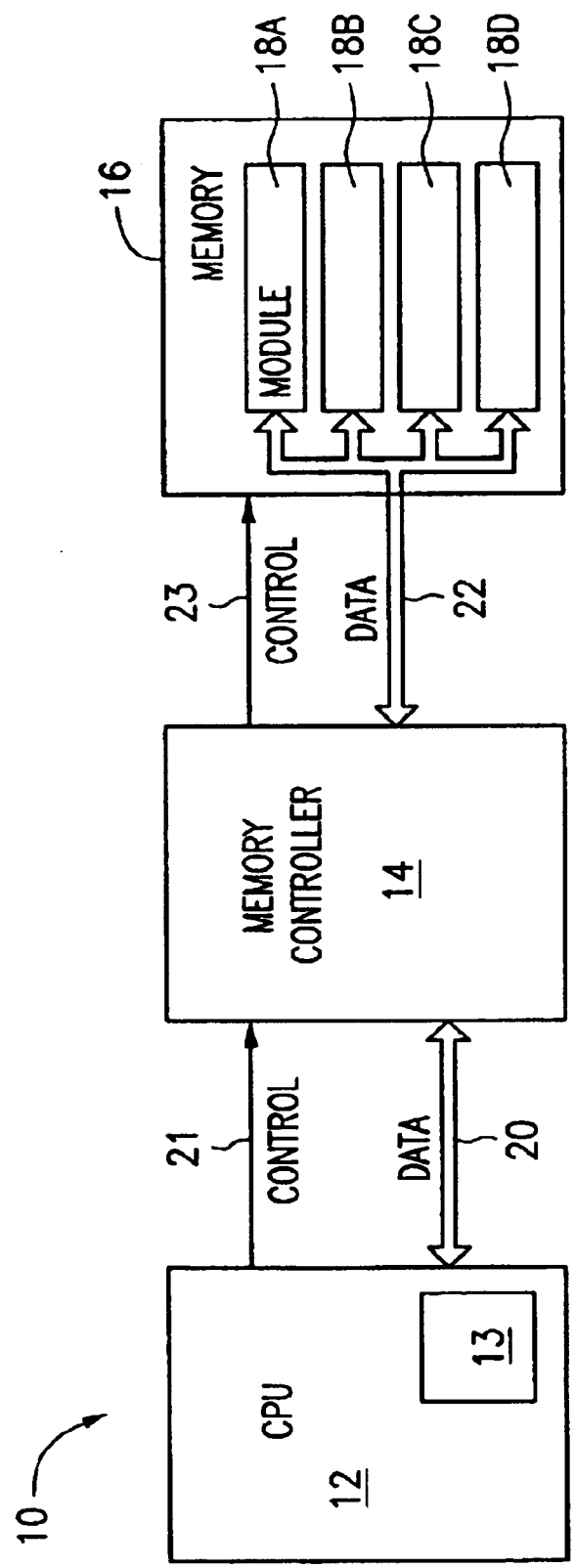
FIG. 1 is a block diagram of an exemplary computer system that incorporates the present invention.

Referring to FIG. 1, a computer system 10 includes a CPU 12 such as a microprocessor which can include, among other things, a static random access memory (SRAM) cache 13. A memory subsystem includes a memory controller 14 which controls access by the CPU 12 to a memory 16. The memory 16 includes one or more memory modules 18A, 18B, 18C, 18D. The memory modules 18A, 18B, 18C, 18D can be, for example, SIMMs, DIMMs, SO-DIMMs, or other types of memory modules. The computer system 10 may include other input/output devices (not shown) as well. In some applications, the computer system 10 forms a personal computer, a notebook computer, or a work station.

The memory controller 14 can be a large scale integrated circuit which receives data and control information from the CPU 12 on one or more lines or buses 20, 21 and provides data and control signals over one or more lines or buses 22, 23 to the memory 16 for reading or writing to a specified memory location. For example, the memory controller 14 generates CAS and RAS signals which are used to strobe column and row addresses into the memory 16. Before a location in memory can be accessed, its column and row addresses are strobed into the memory 16 using the CAS and RAS signals. A write enable signal is provided by the memory controller 14 to enable data to be written to the memory 16.

Figure 2A:
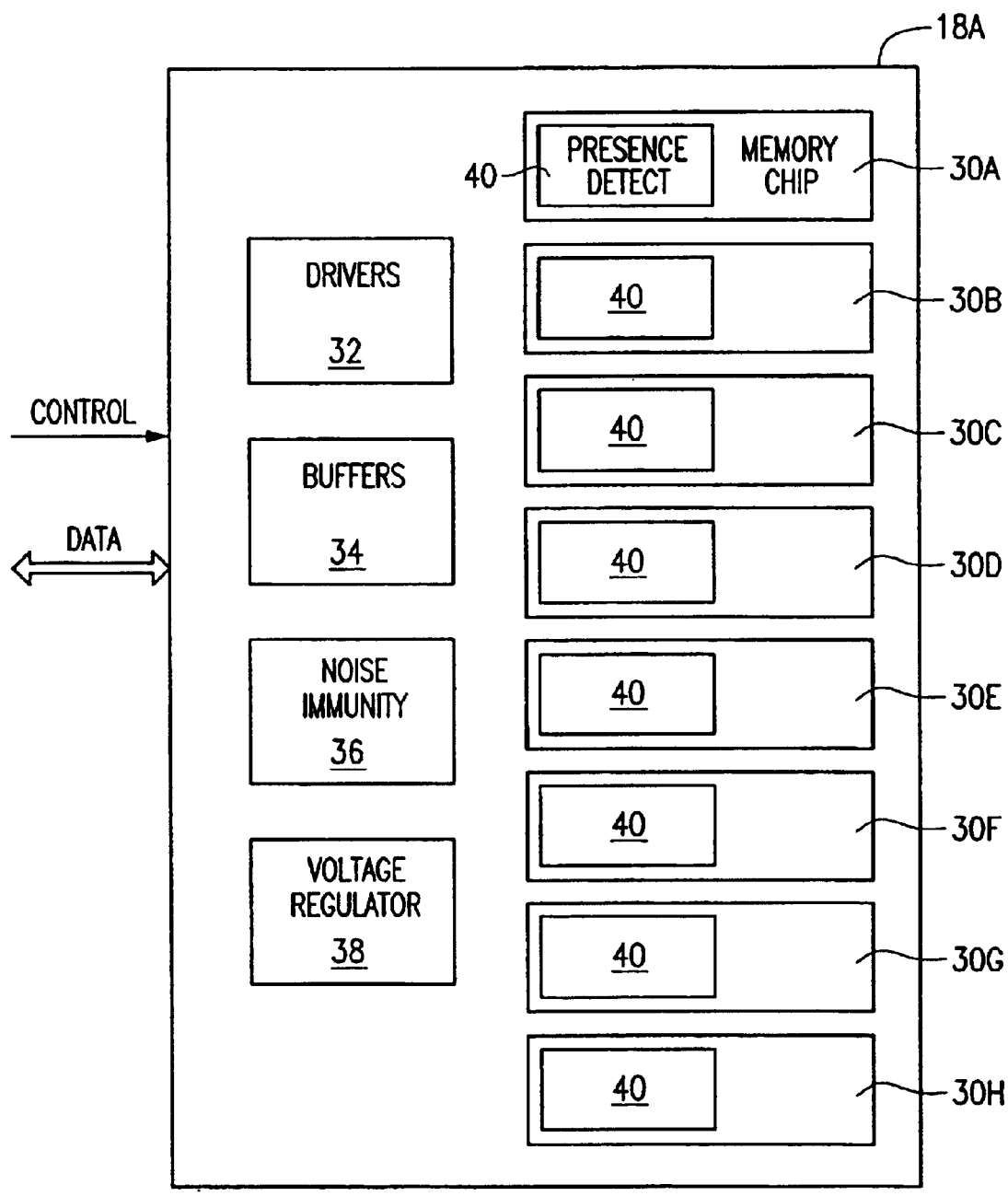
FIG. 2A is a block diagram of an exemplary memory module according to the invention.

Referring to FIG. 2A, an exemplary memory module 18A can support multiple memory chips, such as dynamic random access memory (DRAM) chips 30A, 30B, 30C, 30D, 30E, 30F, 30G, 30H. Typically, all of the DRAM chips 30A through 30H on a single module 18A have the same memory capacity, such as 1 MBit, 4 MBit or 16 MBit. The memory module 18A also includes drivers 32 for receiving and driving the various CAS and RAS signals. The module 18A may also include buffer chips 34 to synchronize input and output data signals using a phase locked loop or a delay locked loop. Capacitors and other circuitry 36 may be provided to provide noise immunity and to protect against dips in current. In some cases, the module 18A also may have a voltage regulator 38 which is needed when the module operates at a lower voltage than other components of the system 10.

In contrast to prior memory modules, the module 18A does not require a separate integrated chip to provide presence detect signals to identify the memory configuration of either the module or the memory chips 30A through 30H. Rather, as shown in the implementation of FIG. 2A, each of the memory chips 30A through 30H includes logic 40 for storing presence detect information and for allowing the presence detect data to be accessed selectively for transmission over the data line 22. The logic 40 is incorporated into the integrated circuit which forms each respective memory chip 30A through 30H. Thus, each memory chip, such as the memory chip 30A, can store presence detect data which can be provided to the memory controller 14 over the data line 22 in response to a control signal received on the control line 23. The presence detect data includes multiple bits with the number of presence detect bits depending on the configuration and capabilities of the memory. Also, depending on the particular application, various presence detect bits may define which CAS latencies are supported by the memory chip, the cycle time or speeds associated with the chip, the memory capacity of the chip, and other features of the memory chip.

Figure 2B:
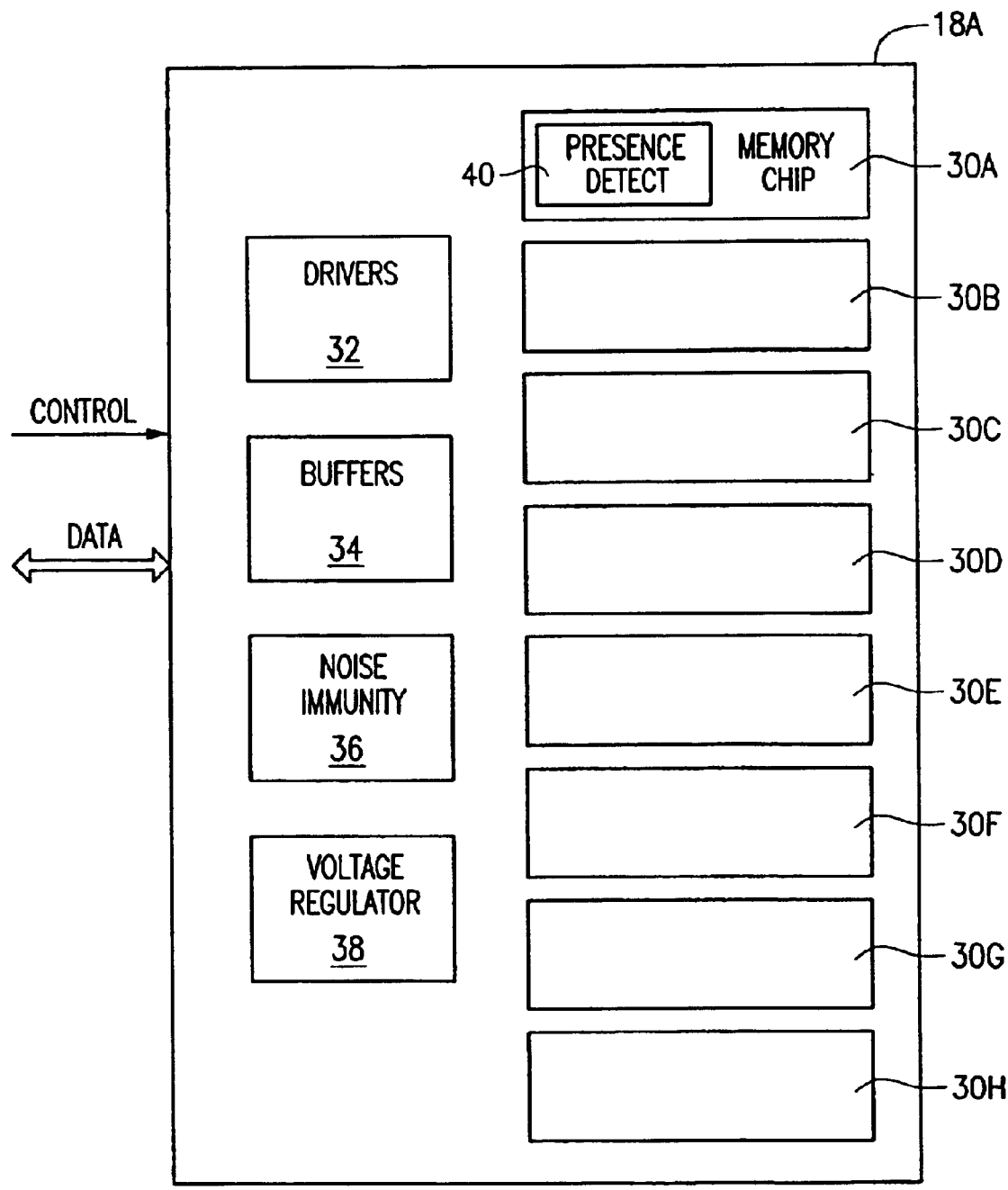
FIG. 2B is a block diagram of an exemplary memory module according to another embodiment of the invention.

Although each memory chip 30A through 30H can be provided with its own presence detect logic 40 for storing and providing access to presence detect data, this need not be the case. Thus, in situations where the features of each of the memory chips on the module 18A are substantially the same, the presence detect logic 40 need only be provided on a single one of the memory chips 30A through 30H on the module 18A, as shown in FIG. 2B.

Figure 3:
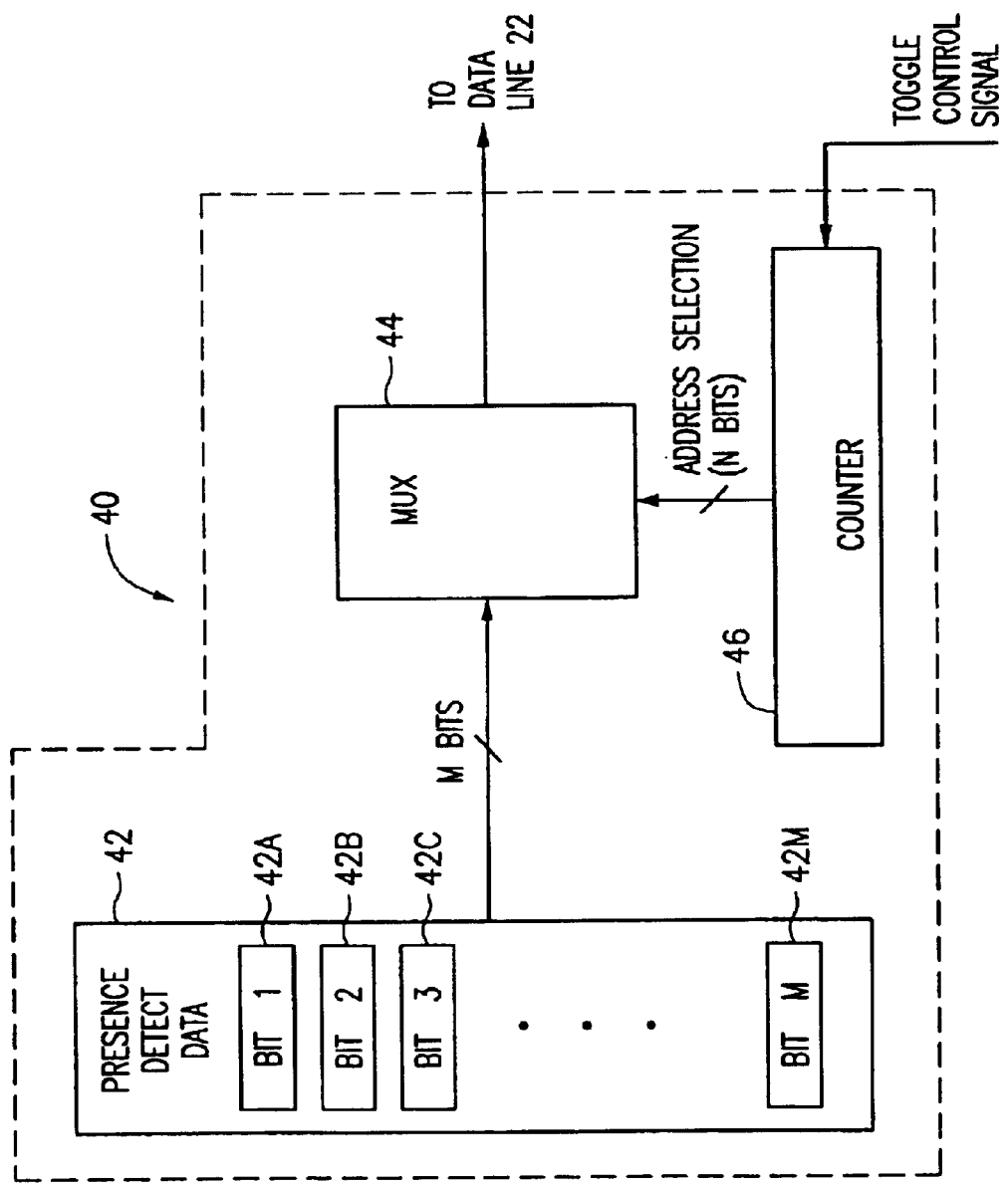
FIG. 3 is a block diagram of a presence detect data circuit according to the invention.

Referring to FIG. 3, the presence detect logic 40 stores presence detect data 42 including M bits of data 42A through 42M. For example, in one implementation, there may be as many as 128 bytes of presence detect data. For the purposes of illustration, however, it will be assumed that there are only 8 bits of presence detect data in the exemplary embodiment described below.

The presence detect bits are provided as inputs to a multiplexer (MUX) 44 or other switching device. The MUX 44 also receives N bits of address selection signals to allow each of the presence detect bits 42A through 42M to be selected individually. In general, the values of N and M can be related by the following equation:

$$N=\log_2 M.$$

Thus, to select one of eight presence detect bits, three address selection bits are required. The address selection signals are generated by a counter 46 which receives a toggle control signal generated by the CPU 12. When the toggle control signal is received by the counter 46, the value generated at the output of the counter is incremented by one. The value of the selected presence detect bit then is provided as an output from the MUX 44 and is sent over the data line 22 to the CPU 12 via the memory controller 14. Thus, the presence detect data 42 can be transmitted serially, one bit at a time, over the data line 22.

Figure 4:
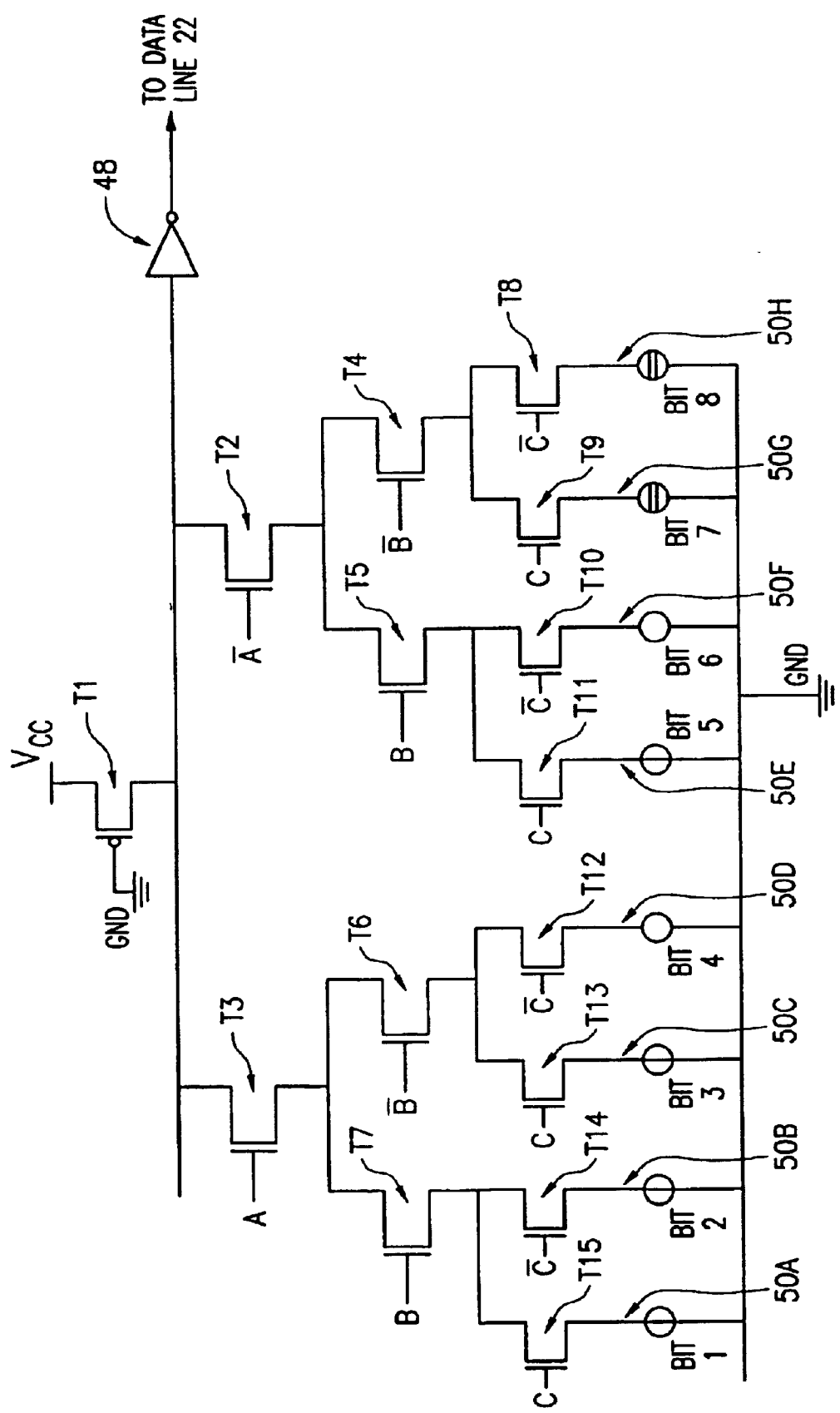
FIG. 4 is an exemplary circuit diagram for implementing the presence detect data according to the invention.

FIG. 4 illustrates one particular circuit for the MUX 44 with one of eight presence detect bits provided at its output. The value of a particular presence detect bit depends on whether a respective source 50A through 50H of a corresponding one of the transistors T9 through T15 is electrically connected to ground (GND) or represents an open circuit.

Some of the presence detect bits can be programmed during fabrication of the memory chip 30A, while others remain programmable so that they can be programmed at a subsequent time, for example, during back-end repair or after packaging of the chip. Thus, as shown in FIG. 4, the values of some of the presence detect bits (e.g., bits 1 through 6) have been hardwired while others (e.g., bits 7 and 8) remain programmable. Specifically, presence detect bits 1, 2, 3 and 5 have been hardwired as digital low signals by electrically connecting the respective sources 50A, 50B, 50C and 50E of transistors T15, T14, T13 and T11 to ground during fabrication of the memory chip 30A. In FIG. 4, the optional hardwiring of an electrical line to ground is indicated by a circle with a vertical line through it. Additionally, presence detect bits 4 and 6 have been hardwired during fabrication of the memory chip 30A by leaving an open circuit between ground and the respective sources 50D, 50F of transistors T12, T10. In FIG. 4, the optional hardwiring of an electrical line as an open circuit is indicated by an open circle. Presence detect bits 7 and 8 remain programmable. As discussed in greater detail below, each programmable presence detect bit can be implemented, for example, by an antifuse which, in FIG. 4, is represented by a circle with two horizontal lines through it.

Still referring to FIG. 4, a series of switching transistors T1 through T15 are cascaded to allow the presence detect bits to be selected one at a time. A particular presence detect bit is selected based on the value of the address selection bits (represented in FIG. 4 as A, B and C) generated by the counter 46. For example, when the values of address bits A, B and C turn on the transistors T3, T7 and T15, presence detect bit 1 is selected and its value serves as the input to an inverter 48. Similarly, when the values of address bits A, B and C turn on the transistors T2, T5 and T10, presence detect bit 6 is selected and its value serves as the input to the inverter 48. Additional transistors can be added to increase the number of hardwired or programmable presence detect bits.

When a particular presence detect bit is selected, the input to the inverter 48 will be a digital low signal if the source of the corresponding one of the transistors T9 through T15 is connected electrically to ground. In that case, the output of the inverter 48, which is electrically connected to the data line 22, would be a digital high signal. Conversely, the input to the inverter 48 will be a digital high signal if the source of the corresponding one of the transistors T9 through T15 is not electrically connected to ground. In that case, the transistor T1 pulls the voltage at the input of the inverter 48 to a digital high signal, so that the output of the inverter is a digital low signal.

Preferably, the transistor T1 has a relatively high resistance. For example, a long-channel transistor T1 can be provided for that purpose. In other implementations, a resistor can be used in place of the transistor T1.

Figure 5A:
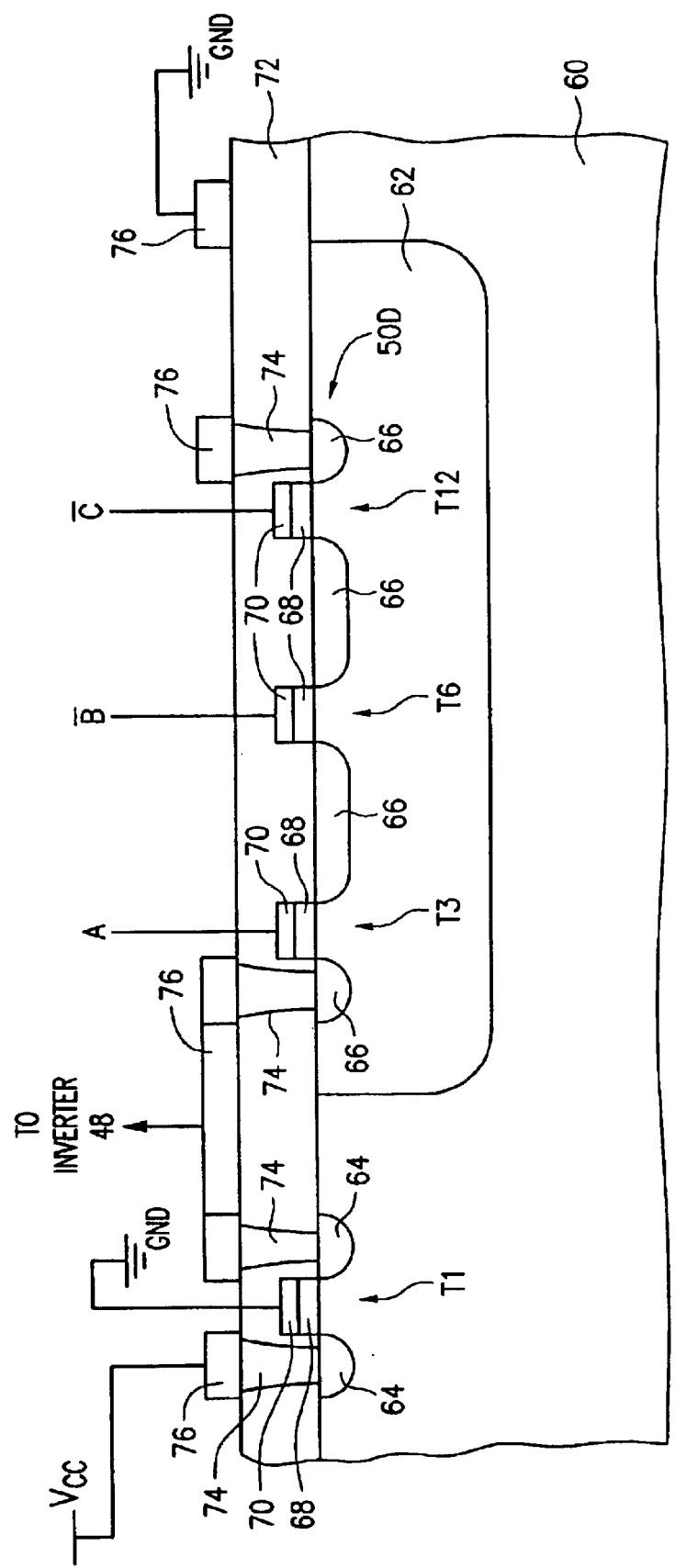
Figure 5B:
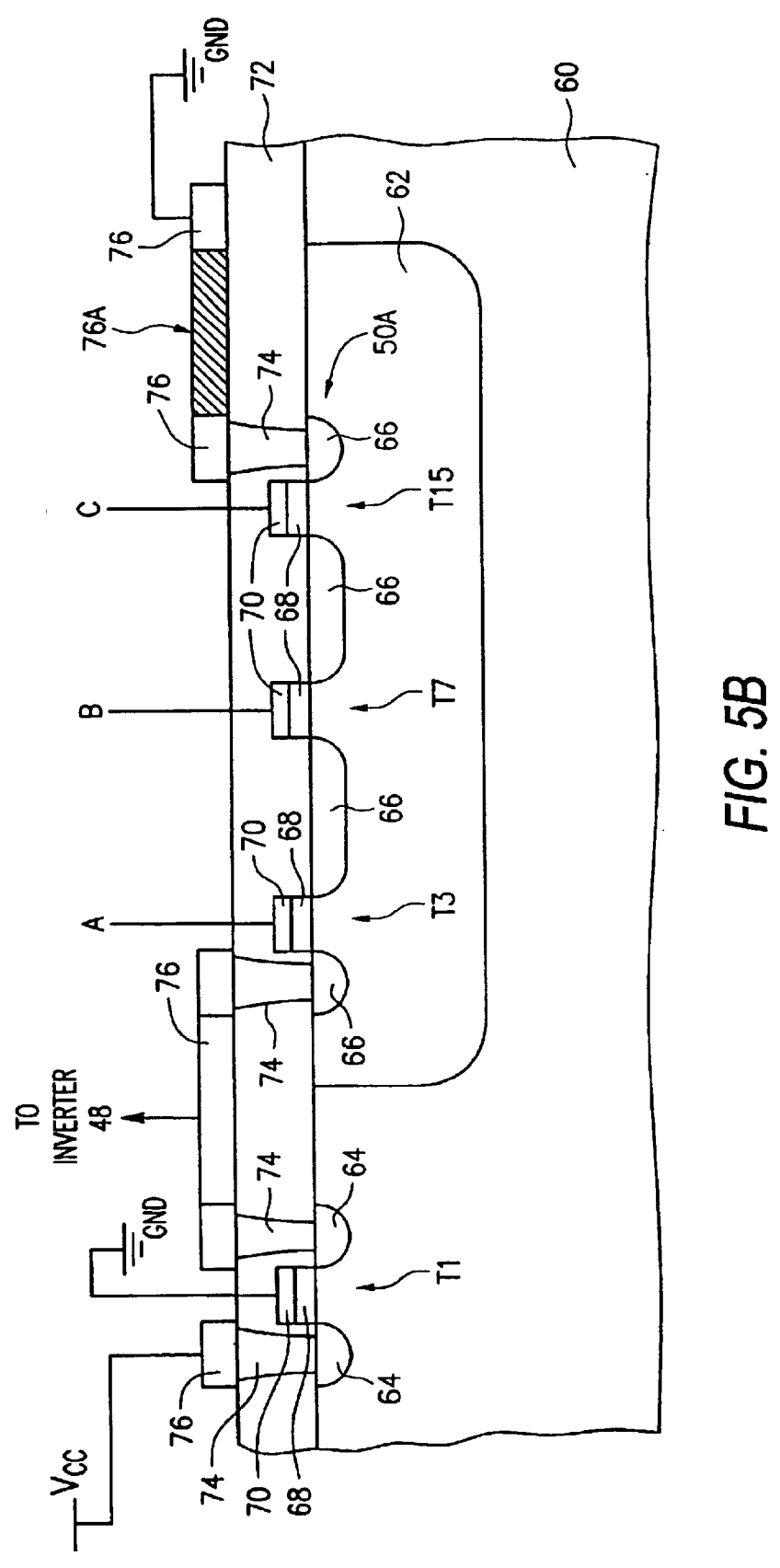

Referring to FIGS. 5A and 5B, cross-sections of exemplary implementations of an integrated circuit for hardwiring one or more presence detect bits on the memory chip 18A are illustrated. In particular, FIG. 5A illustrates presence detect bit 4 which is hardwired so that the input to the inverter 48 is a digital high signal when that bit is selected. FIG. 5B illustrates presence detect bit 1 which is hardwired so that the input to the inverter is a digital low signal when that bit is selected.

Referring to FIG. 5A, a p-type well 62 is provided in a semiconductor substrate 60 which, in the illustrated implementations, is n-type. Several n+ doped regions 66 are formed in the well 62 and serve as the source and drain regions of the transistors T3, T6 and T12. Similarly, p+ doped regions 64 are formed in the substrate 60 and serve, respectively, as the source and drain for the transistor T1. Each transistor T1, T3, T6 and T12 has a gate which can include a dielectric layer 68, such as a silicon dioxide ($SiO_2$) layer, and a conductive layer 70, such as a polysilicon layer, disposed over the dielectric layer. A relatively thick insulating layer 72 which can include, for example, a borophosphate-silicate glass (BPSG) layer, covers the surface of the substrate 60. Contact holes are formed through the BPSG layer 72 and are filled with a conductive material, such as tungsten (W), to form conductive contacts 74 to some of the doped regions 64, 66. Metal contacts 76, which may comprise, for example, aluminum and/or copper, electrically connect the transistors T1, T3, T6 and T12 as previously discussed with respect to FIG. 4. As illustrated at the far-right hand side of FIG. 5A, the source 50D of the transistor T12 is not electrically connected to ground. Accordingly, when the presence detect bit illustrated in FIG. 5A is selected by turning on the transistors T3, T6 and T12, the input to the inverter 48 will be a digital high signal.

Referring now to FIG. 5B, the illustrated doped regions 64, 66 serve as the source and drain regions of the transistors T1, T3, T7 and T15. As illustrated at the far-right hand side of FIG. 5B, the source 50A of the transistor T15 is electrically connected to ground by the addition of a portion 76A of the metal layer. Accordingly, when the presence detect bit illustrated in FIG. 5B is selected by turning on the transistors T3, T7 and T15, the input to the inverter 48 will be a digital low signal.

A photolithographic mask pattern can be used during fabrication of the metallization layer 76 so that the source of each transistor T10 through T15 optionally is electrically connected to ground or left as an open circuit. Specifically, the photolithographic mask pattern determines whether the optional portion 76A of the metal layer 76 is provided for each of the hardwired presence detect bits. Bits that are hardwired using mask programmable photolithographic or other mask patterns during fabrication of the memory chip 18A can be referred to as mask programmable presence detect bits.

Figure 6A:
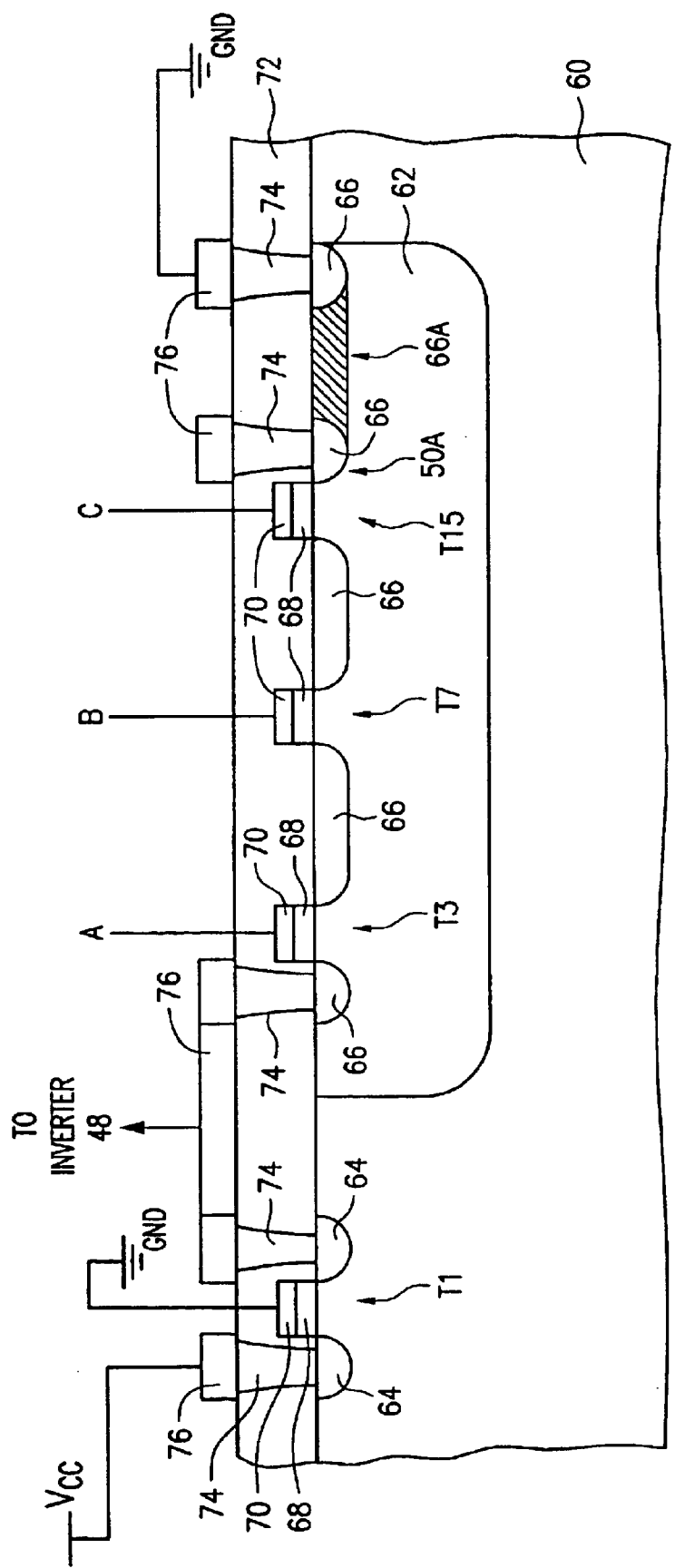
FIG. 6A is a cross-sectional diagram of a semiconductor device illustrating an alternative embodiment for hardwiring a presence detect bit during fabrication of a memory chip.
Figure 6B:
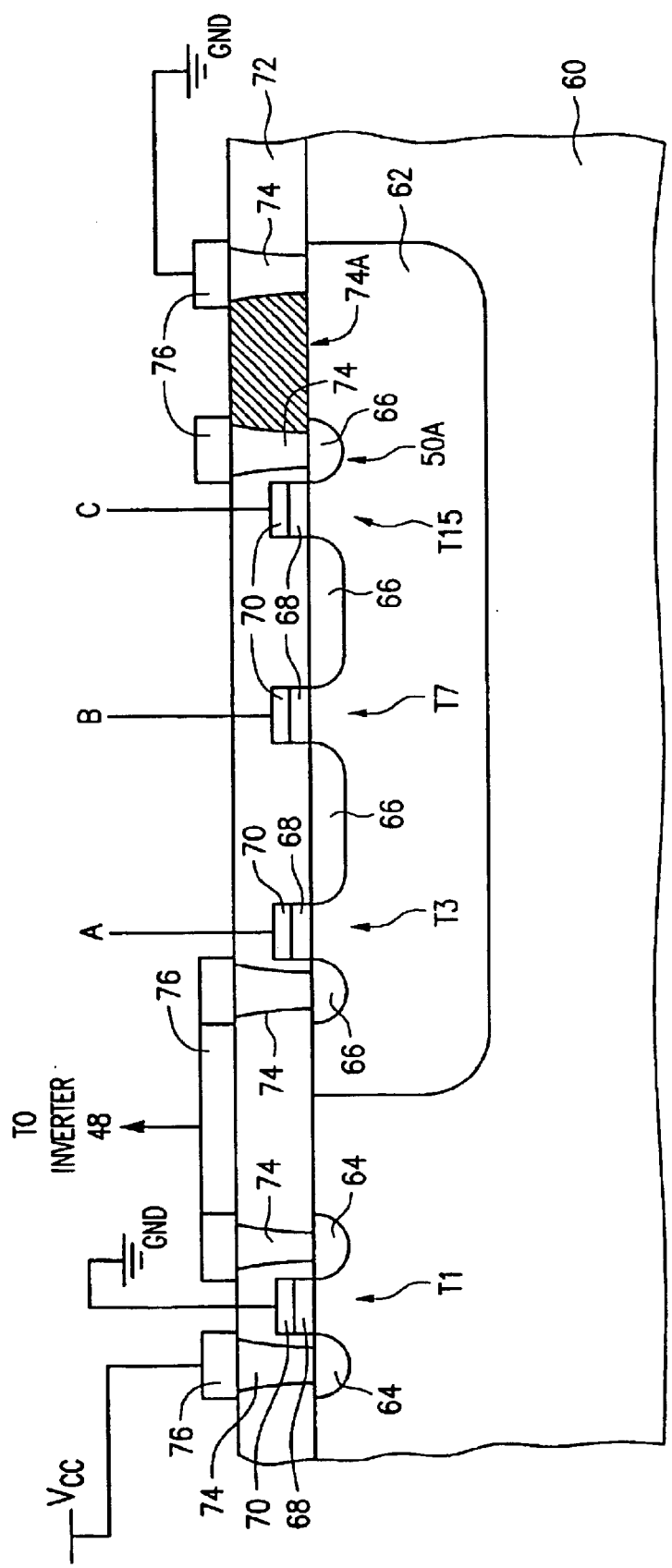
FIG. 6B is a cross-sectional diagram of a semiconductor device illustrating yet another embodiment for hardwiring a presence detect bit during fabrication of a memory chip.

As described above, the metal layer 76 can be used to hardwire presence detect bits during the fabrication process based on the presence or absence of the portion 76A of the metal layer. More generally, however, presence detect bits can be hardwired on the memory chip 30A during the formation of any conductive layer, including polysilicon contacts, metal contacts, or active regions. FIGS. 6A and 6B illustrate a presence detect bit, such as bit 1, which has been hardwired using active regions 66 and conductive contacts 74, respectively. In FIG. 6A, an area 66A of the active region 66 optionally can be provided using a photolithographic mask pattern so that the source 50A of the transistor T15 is electrically connected to ground or left as an open circuit. Alternatively, in FIG. 6B, a region 74A of the contact layer 74 optionally can be provided using a photolithographic mask pattern so that the source 50A of the transistor T15 is electrically connected to ground or left as an open circuit.

In the foregoing implementations, the value of each hardwired bit is based on whether a corresponding conductive region (e.g., a metal line or contact, a polysilicon plug, a doped region of the semiconductor substrate, etc.) is electrically connected to ground when power is provided to the chip. However, in other implementations, the value of each hardwired bit can be based on whether the corresponding conductive region is electrically connected to predetermined voltage level other than ground.

As previously noted, in addition to the presence detect bits that are hardwired based on photolithographic mask patterns used during fabrication of the memory chip 30A, other presence detect bits remain programmable. In one embodiment, each programmable presence detect bit, such as bits 7 and 8 (FIG. 4) can be implemented, for example, as an antifuse.

Figure 7:
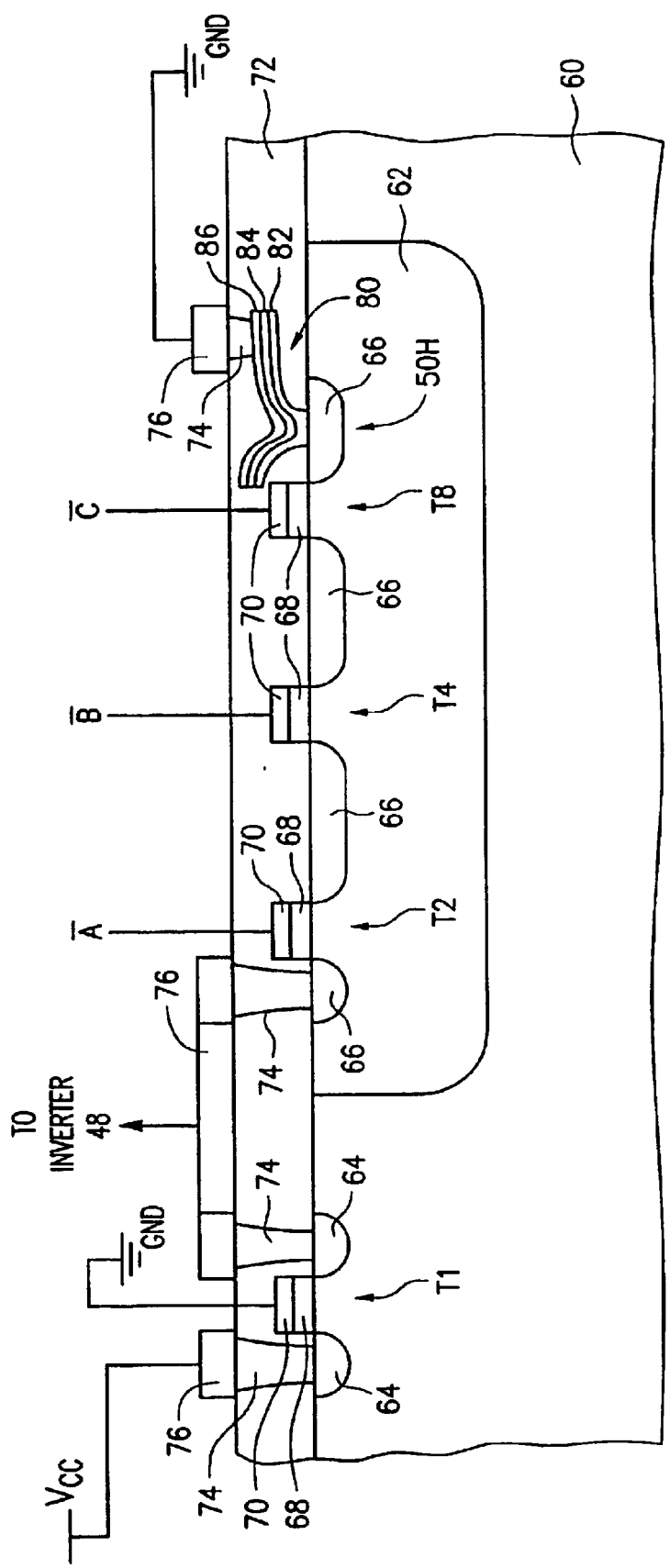
FIG. 7 is a cross-sectional diagram of a semiconductor device illustrating a technique for providing presence detect bits that are programmable after fabrication of a memory chip.

Referring to FIG. 7, an implementation of a programmable presence detect bit on the memory chip 30A using an antifuse is now described. Many of the elements in FIG. 7 are the same as or similar to the corresponding elements previously discussed with respect to FIGS. 5A and 5B. In FIG. 7, doped regions 64, 66 serve as the source and drain regions of the transistors T1, T2, T4 and T8 which are connected electrically as in FIG. 4. As illustrated at the far right-hand side of FIG. 7, an antifuse 80 is provided above the source 50H of the transistor T8. The antifuse 80 can be formed as a capacitive structure with an insulating layer 84 sandwiched between lower and upper plates 82, 86. The lower and upper plates 82, 86 can comprise, for example, polysilicon, and the insulating layer 84 can comprise, for example, a dielectric material such as silicon nitride. The lower plate 82 is electrically in contact with the region 66 which forms the source 50H of the transistor T8.

Following fabrication of the memory chip 30A, the programmable presence detect bits can be programmed at various times including, for example, during back-end repair of the chip or even after packaging of the chip. To program presence detect bit 8 so that the input to the inverter 48 is a digital low signal when the bit is selected, a permanent conductive path is provided between the source 50H of the transistor T8 and ground. That can be accomplished by applying a sufficiently large voltage across the antifuse 80 to form a short circuit through the dielectric material 84. For example, a voltage higher than the breakdown voltage of the dielectric layer 84 can be applied across the antifuse 80. On the other hand, if a permanent conductive path is not formed between the source 50H of the transistor T8 and ground, then an open circuit remains between the source 50H of the transistor T8 and ground. In that case, when presence detect bit 8 is selected, the input to the inverter 48 will be a digital high signal.

In alternative implementations, instead of the antifuse 80, other types of fuses, such as an electrical fuse or a laser fuse can be used to provide one or more programmable presence detect bits. For example, in one implementation, a polysilicon plug is provided instead of the antifuse 80 during fabrication of the memory chip 30A. A conductive path would then be present between the source of the transistor T8 and ground. To program the corresponding presence detect bit so that the input to the inverter 48 is a digital high signal when the bit is selected, laser radiation can be directed at the polysilicon plug to form an open circuit between the source 50H and ground.

Figure 8A:
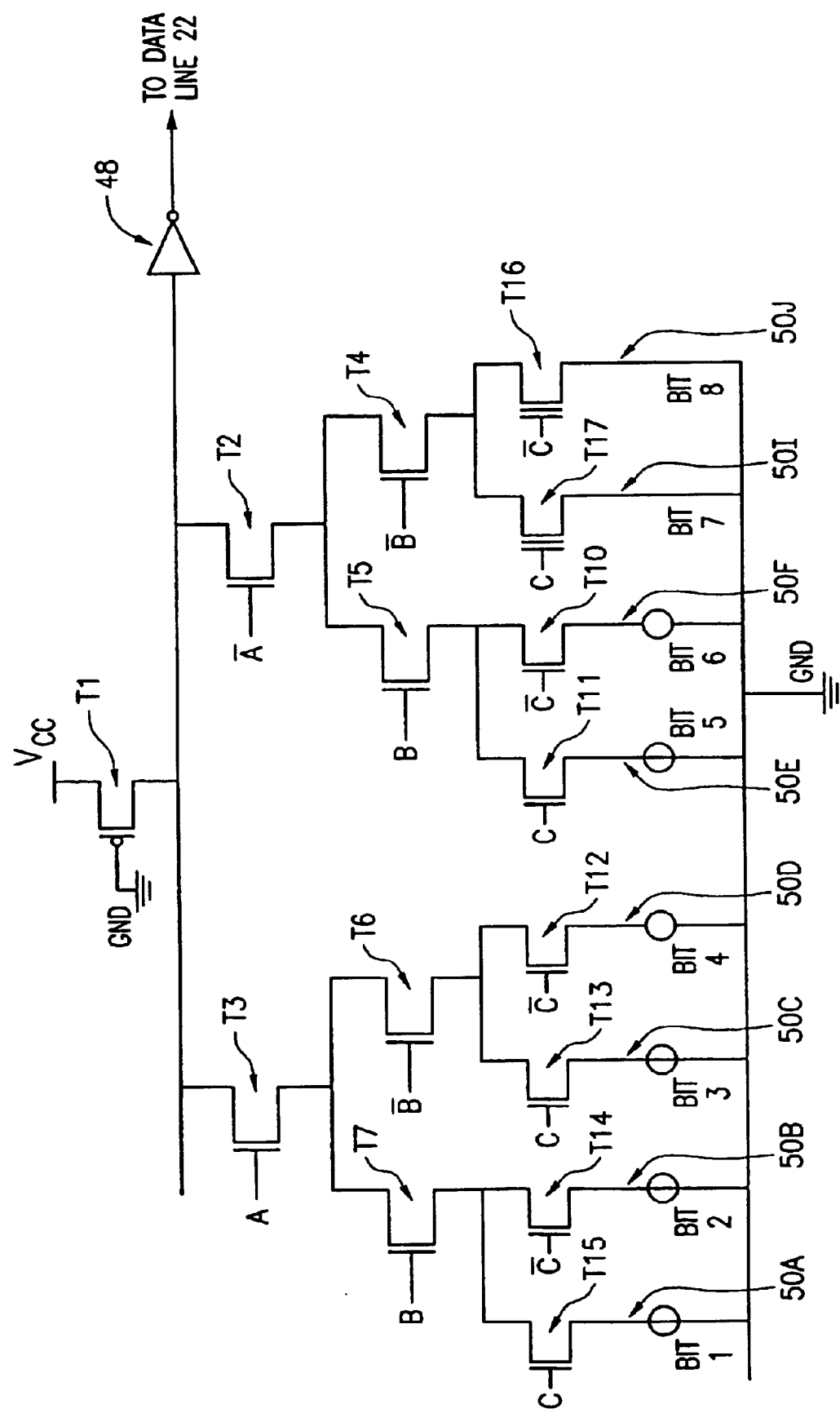
FIG. 8A is another embodiment of an exemplary circuit diagram for providing both hardwired and programmable presence detect data according to the invention.
Figure 8B:
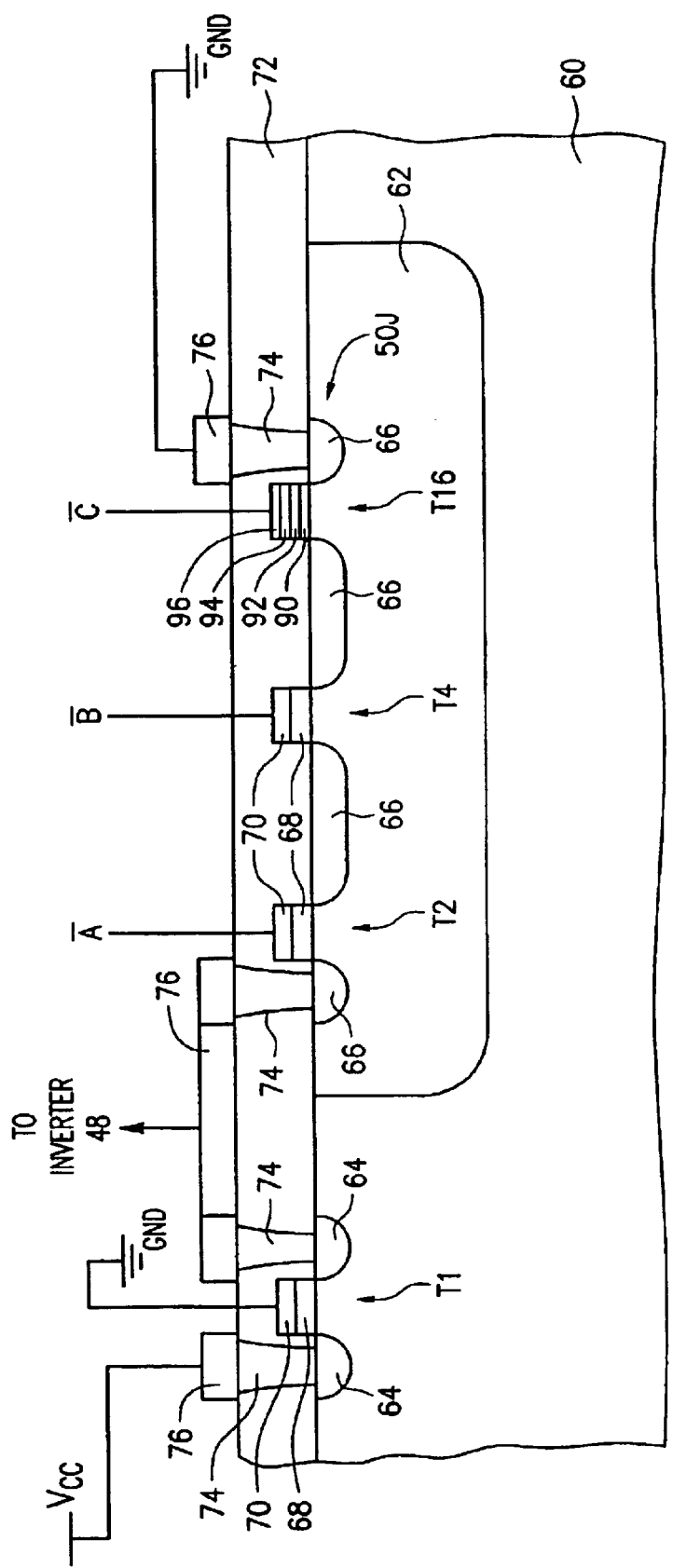
FIG. 8B is a cross-sectional diagram of a semiconductor device illustrating a programmable presence detect bit that can be used in the circuit of FIG. 8A.

In yet a further embodiment, one or more programmable presence detect bits can be provided by using flash memory transistors, as shown in FIG. 8A. The circuit of FIG. 8A is similar to the circuit of FIG. 4 except that the transistor T8 and the associated antifuse have been replaced by the flash transistor T16, and the transistor T9 and associated antifuse have been replaced by the flash transistor T17. Referring to FIG. 8B, the structure of each flash transistor, such as the flash transistor T16, can include two stacked polysilicon gates 92, 96 which are separated from each other and from the semiconductor well 62 by insulating layers 90, 94 of silicon dioxide. The gate 92 closer to the substrate is a floating gate, and the upper gate 96 is a control gate which is used to turn on the transistor.

Under the initial condition following fabrication of the memory chip 30A, when presence detect bit 8 is selected, a channel is created between the source and drain of the flash transistor T16, thereby permitting the flow of current. The input to the inverter 48 then will be a digital low signal. The value of presence detect bit 8 can be changed by applying a relatively large voltage across the drain and control gate of the flash transistor T16 such that some of the electrons in the channel gain enough energy to cross the silicon dioxide layer 94 and impinge on the floating gate where they become trapped. The trapped charge raises the turn-on threshold voltage level of the flash transistor T16 so that it is not turned on when normal operating voltages are applied. The transistor T16 is, therefore, charged and represents an open circuit. When presence detect bit 8 is selected, the input to the inverter 48 will be a digital high signal.

A memory module 18A having one or more integrated circuit memory chips, such as the memory chip 30A, has been described. At least one of the memory chips on the module includes logic for storing presence detect data on the chip and for providing that data to the data line 22 for transmission to the memory controller 14 which can pass the presence detect data to the CPU 12. Furthermore, one or more of the bits of presence detect data can be hardwired on the memory chip 30A during initial fabrication and manufacture of the chip. At the same time, programming capabilities can be reserved with respect to other presence detect bits whose values can be programmed at a later time. In some cases, all of the presence detect bits can be hardwired during fabrication of the memory chip, and in other cases, all of the presence detect bits can be programmable. More generally, however, the memory chip 30A can include a combination of hardwired and programmable presence detect bits.

Although the foregoing implementations have been described with respect to a computer system in which a memory chip with the presence detect logic forms part of a memory module, in other implementations a memory chip with presence detect data capabilities as described herein may be mounted elsewhere in the system, for example, on a motherboard.

A non-exhaustive list of types of information which can be provided by the presence detect logic 40 includes: the number of row and column addresses; the data width; the voltage interface standard; the CAS latencies which are supported; various clock delays; refresh rates and types; and various manufacturing dates and codes. Other information also can be incorporated into the presence detect data 42 that is stored on the memory chip 30A. In some cases, only some of the foregoing types of presence detect data may be stored on a particular memory chip 30A.

Presence detect bits whose values are fixed for a particular product are exemplary of the types of presence detect data which it is desirable to hardwire during fabrication of the memory chip 30A. Such data includes, for example, presence detect bits which define the CAS latencies supported by the memory chip 30A and the memory capacity of the chip.

Providing the presence detect data on the memory chip(s) rather than on a separate integrated circuit can help reduce the number of integrated chips required for the memory module 18A. Furthermore, hardwiring at least some of the presence detect data during fabrication of the chip, such as during photolithographic processes, can reduce the number of programming errors as well as the number of mismatches that might otherwise occur if a separate presence detect data chip were used. On the other hand, reserving programming capability for some of the presence detect data provides additional flexibility, allowing the foregoing techniques to be used with a wide variety of memory chips, modules, and systems. Furthermore, the foregoing techniques are easily integrated into conventional fabrication process flows for memory chips such as DRAMs.

Other implementations are within the scope of the following claims.

What is claimed is:

1. A method of forming a semiconductor memory device comprising:

forming a presence detect data circuit on a common substrate with a memory storage circuit, said presence detect data circuit including a plurality of data bit devices;

depositing a conductive mask above said substrate;

fixing a data-storage state of a first subset of data bit devices with said conductive mask, said first subset of data bit devices including one or more of said plurality of data bit devices; and programming a second subset of data bit devices, said second subset of data bit devices including one or more of said plurality of data bit devices.

2. A method of forming a semiconductor memory device as defined in claim 1 wherein said fixing a data-storage state comprises:

short-circuiting said first subset of data bit devices.

3. A method of forming a semiconductor memory device as defined in claim 1 wherein said fixing a data-storage state comprises:

open-circuiting said first subset of data bit devices.

4. A method of forming a semiconductor memory device as defined in claim 1 wherein said programming a second subset of data bit devices comprises:

laser fusing said second subset of data bit devices.

5. A method of forming a semiconductor memory device as defined in claim 1 said programming a second subset of data bit devices comprises:

electrically fusing said second subset of data bit devices.

6. A method of forming a semiconductor memory device as defined in claim 1 wherein said plurality of data bit devices comprises a plurality of flash transistors.

7. A method of forming a semiconductor memory device as defined in claim 1 further comprising:

forming a multiplexer circuit on said substrate, said multiplexer circuit including a presence detect data input port and a control input port; and coupling one or more of said plurality of data bit devices to said presence detect data input port.

8. A method of forming a semiconductor memory device as defined in claim 1 further comprising:

forming a counter circuit on said substrate;

coupling an output port of said counter circuit to said control input port of said multiplexer circuit; and coupling an input port of said counter circuit to a toggle control signal input of said semiconductor memory device.

9. A method of forming a semiconductor memory device comprising:

forming a presence detect data circuit on a common substrate with a memory storage circuit, said presence detect data circuit including a plurality of data bit devices;

fixing a data-storage state of a first subset of said plurality of data bit devices during a first time interval;

processing said substrate during a second time interval, said second time interval being subsequent to said first time interval; and programming a second subset of said plurality of data bit devices during a third time interval, said third time interval being subsequent to said second time interval.

10. A method of forming a semiconductor memory device as defined in claim 9 wherein said processing said substrate during a second time interval comprises encapsulating said substrate during said second time interval.

* * * * *